United States Patent [19]
Thayer

[11] Patent Number: 5,218,686
[45] Date of Patent: Jun. 8, 1993

[54] COMBINED SYNCHRONOUS AND ASYNCHRONOUS MEMORY CONTROLLER

[75] Inventor: John S. Thayer, Houston, Tex.

[73] Assignee: Compaq Computer Corporation, Houston, Tex.

[21] Appl. No.: 431,656

[22] Filed: Nov. 3, 1989

[51] Int. Cl.[5] .................. G06F 13/20; G06F 13/36; G06F 13/38
[52] U.S. Cl. .................. 395/425; 364/DIG. 1; 364/240; 364/240.5; 364/240.3; 395/500
[58] Field of Search ... 364/200 MS File, 900 MS File, 364/DIG. 1, 240, 240.5, 240.3; 395/425, 500

[56] References Cited

U.S. PATENT DOCUMENTS

| | | |
|---|---|---|
| 3,999,163 | 12/1976 | Levy et al. |
| 4,292,669 | 9/1981 | Wollum et al. ............... 395/425 X |
| 4,615,017 | 9/1986 | Finlay et al. ................. 395/425 X |
| 4,937,777 | 6/1990 | Flood et al. .................. 395/325 |

FOREIGN PATENT DOCUMENTS 0135879  4/1985  European Pat. Off. .

OTHER PUBLICATIONS

C. H. Chan, et al., A CMOS Multi-Mode Data Acquisition System Implemented Using a Workstation Based VLS1 Design Environment, IEEE, Electronicom '85, Oct. 6-11, 1985, pp. 28-31.
IBM Technical Disclosure Bull., Direct, Asynchronous and Synchronous Storage Card, vol. 29, No. 4, Sep. 1986, pp. 1452-1456.

Primary Examiner—Alyssa H. Bowler
Attorney, Agent, or Firm—Pravel, Gambrell, Hewitt, Kimball & Krieger

[57] ABSTRACT

A memory controller has an asynchronous portion and a synchronous portion. The synchronous portion is used when the system processor is accessing the memory, while the asynchronous portion is used when control of the memories is held by a DMA controller or a bus master located on a standardized bus.

5 Claims, 7 Drawing Sheets

COMBINED SYNCHRONOUS AND ASYNCHRONOUS MEMORY CONTROLLER

BACKGROUND OF THE INVENTION

1. Field of the Invention

The invention relates to memory controllers utilized in computer systems, and more particularly, to computer systems which allow multiple sources to access a given block or portion of memory.

2. Description of the Related Art

Personal computer systems are getting more and more powerful at a very rapid rate. One reason for this increase in power is the development and availability of more powerful microprocessors, which form the basis of the personal computers. New microprocessor designs are being developed and the clock rates of the existing microprocessors are being increased so that more and more performance is available.

With the development of 32 bit microprocessors, the main memory was separated from the physical slots provided for interchangeable boards which were generally only 8 or 16 bits wide. By separating the main memory array it became possible to make the memory array 32 bits wide and to run at significantly higher speeds then what otherwise would have been possible over the bus connecting the slots. However, to utilize this memory array a memory controller was required which could handle cycles coming from the processor and cycles which were generated over the interchangeable circuit board bus. To this end various types of memory controllers were designed for various systems. For instance, for systems according to the industry standard architecture (ISA) based on the International Business Machines Corporation (IBM) PC/AT, synchronous memory controllers were utilized based on the clock provided to the microprocessor. For systems according to the Micro Channel Architecture (MCA) developed by IBM asynchronous memory controllers were developed because this bus definition was an asynchronous design, in deference to the synchronous design of the ISA.

One problem with synchronous controllers is that with each change in microprocessor, either architecture or speed, the memory controller must be redesigned. This leads to great complications in each design. While an asynchronous design can be developed, as in the MCA, these designs are not necessarily optimized for use with a different processor and therefore there would be performance degradation as compared to the ultimate limits possible based on given memory devices. Therefore even an asynchronous design has to be revised with each new microprocessor. Thus system designers were left with the choice of having to redesign the memory controller each time a new processor was utilized, incorporating both processor related functions and bus related functions, or to use an asynchronous design with inherent trade offs in system performance.

SUMMARY OF THE INVENTION

The present invention is a memory controller which performs in synchronous mode while operating with the microprocessor of the computer system and in asynchronous mode when operating with a bus controller located on the interchangeable circuit board bus or using the timing of the bus. In the preferred embodiment the interchangeable circuit board bus is the extended industry standard architecture (EISA) bus. The EISA bus allows multiple masters to control the bus and thus the memory controller provides the interface for the bus masters to access the main memory array. The use of the synchronous portion of the memory controller allows the microprocessor performance to be optimized for each microprocessor with minimal interaction with the EISA bus timings. Use of the asynchronous portion allows the portion of the memory controller relating to the EISA bus to remain constant during processor changes, thus simplifying the overall design task while changing the microprocessor utilized in the personal computer.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
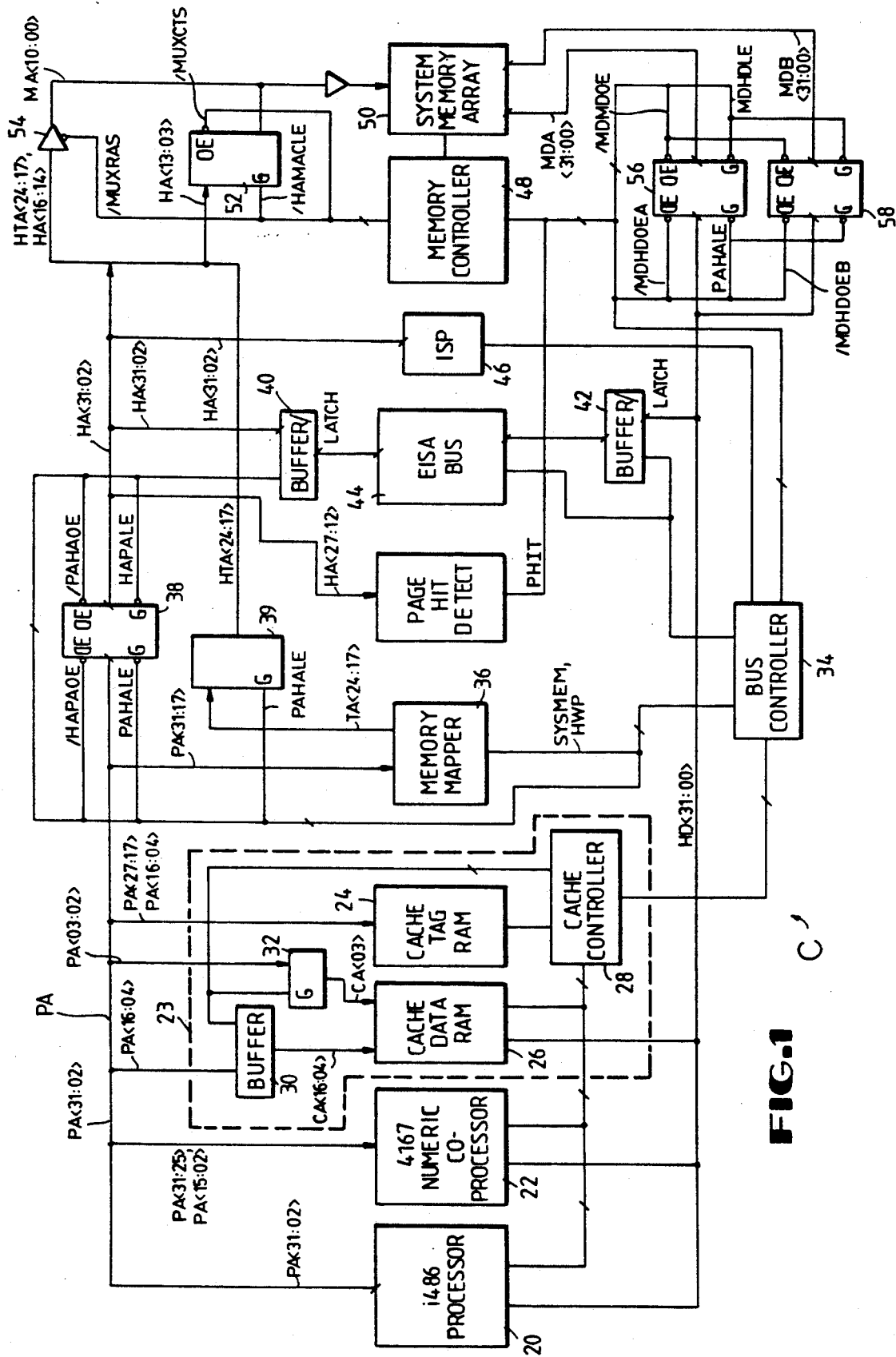
FIG. 1 is a block diagram of a personal computer incorporating the present invention.

Referring now generally to the Figures, the letter C generally represents a computer system according to the present invention. A computer system C includes a processor 20, preferably the i486 or 80486 microprocessor manufactured by Intel Corporation (Intel). Information on the i486 microprocessor is provided in the data book published by Intel and having a date of April 1989. Cooperating with the processor 20 is an optional numeric coprocessor 22, preferably the Weitek 4167, which is designed to cooperate with the i486. The computer system C also includes an external cache memory system 23 for use with the processor 20. The addresses provided by the processor 20 are coupled to form the processor address bus PA. These address lines PA are connected to the numeric coprocessor 22 and to the various portions forming the cache system 23. The cache tag random access memory (RAM) 24 is used to determine when addresses being requested by the processor 20 have valid data stored in the cache data RAM 26. Thus the cache tag RAM 24 monitors the processor address bus PA and provides comparison outputs to a cache controller 28, which determines when a match is present based on the comparison values. The cache controller 28 provides the output signals to a buffer 30 which buffers the processor addresses to the cache data RAM 26. The cache controller 28 also controls a programmable array logic device (PAL) 32 which performs the necessary logical operations to cooperate with the processor 20 in developing the lower address lines to access the cache data RAM 26. The cache controller 28 interfaces with the processor 20 and the numeric coprocessor 22 to use certain control lines developed by the processor 20 and the numeric coprocessor 22 in its operations.

The cache controller 28 is interfaced with a bus controller 34 which controls operation of the computer system C to allow data and addresses to be transferred from the processor portion of the computer system C to the remaining portions. The bus controller preferably includes the 82358 EISA bus controller made by Intel. The bus controller 34 cooperates with the a memory mapper 36 which analyzes the processor address bus PA to determine if the memory addresses are located in a system memory array 50 in the computer system C, if the particular memory location is write protected and to develop certain addresses to be used by the system memory array 50. The bus controller 34 provides the proper signals to pass address values from the processor address bus PA to a host address bus HA. A bidirectional latch 38 is located between the two address buses HA and PA and receives the /HAPAOE, /PAHAOE, PAHALE and HAPALE signal to provide the output enable and latch enable signals used by the latch 38. The bus controller 34 also develops the proper control signals to be used with the bidirectional latches 40 and 42 which respectively provide the address information and data information to and from the extended industry architecture (EISA) bus provided for interchangeable circuit boards. The EISA bus 44 is developed according to the EISA specification, Revision 3.1. This specification is included in U.S. Pat. No. 5,101,492, issued Mar. 31, 1992, which patent is hereby incorporated by reference. Familiarity with the document is presumed in this description. The bus controller 34 also cooperates with the integrated system peripheral (ISP) 46. The integrated system peripheral 46 handles the direct memory access (DMA), refresh, interrupt and bus arbitration functions for a computer system built according to the EISA specification. The ISP 46 arbitrates whether the processor 20, the DMA controller, the refresh controller or a bus master located on the EISA bus 44 is in control of the EISA bus 44, the host bus and the computer system C. Control rotates based on a priority schedule so that the devices will gain control of the bus for some period of time.

The bus controller 34 cooperates with a memory controller 48 which controls the operation of various latches and buffers and the memory devices in the system memory array 50. The memory controller 48 produces a signal referred to as HAMACLE which is the latch enable signal provided to a latch 52 which transfers portions of the addresses provided on the host bus HA to the system memory array 50. Additionally, the memory controller 48 produces signals referred to as /MUXRAS and /MUXCAS which, respectively, enable a buffer array 54 connected between the host address bus HA and the memory addresses provided by the memory mapper 36 and the system memory array 50 and the output of the latch 52 so that row and column addresses are properly provided to the memory devices in the system memory array 50. The memory controller 48 also provides the /HDMDOE, MDHDLE, /MDHDOEA, and /MDHDOEB and the bus controller 34 provides the PAHALE signal, which are supplied to two bidirectional latches 56 and 58 to transfer data between the host data bus HD, which is connected to the processor 20, the cache data RAM 26 and coupled to the EISA bus 44 and the system memory array 50. Two latches 56 and 58 are utilized in the preferred embodiment because the system memory array 50 is preferably 64 bits wide and because the host data bus HD is preferably 32 bits wide, two buffer sets are utilized.

The memory controller 48 has two portions, an asynchronous portion for use for controlling accesses by the ISP 46 or from bus masters located on the EISA bus 44 and a synchronous portion for use for accesses from the processor 20. Operation of the memory controller 48 and more details on its construction will be provided.

Figure 2:
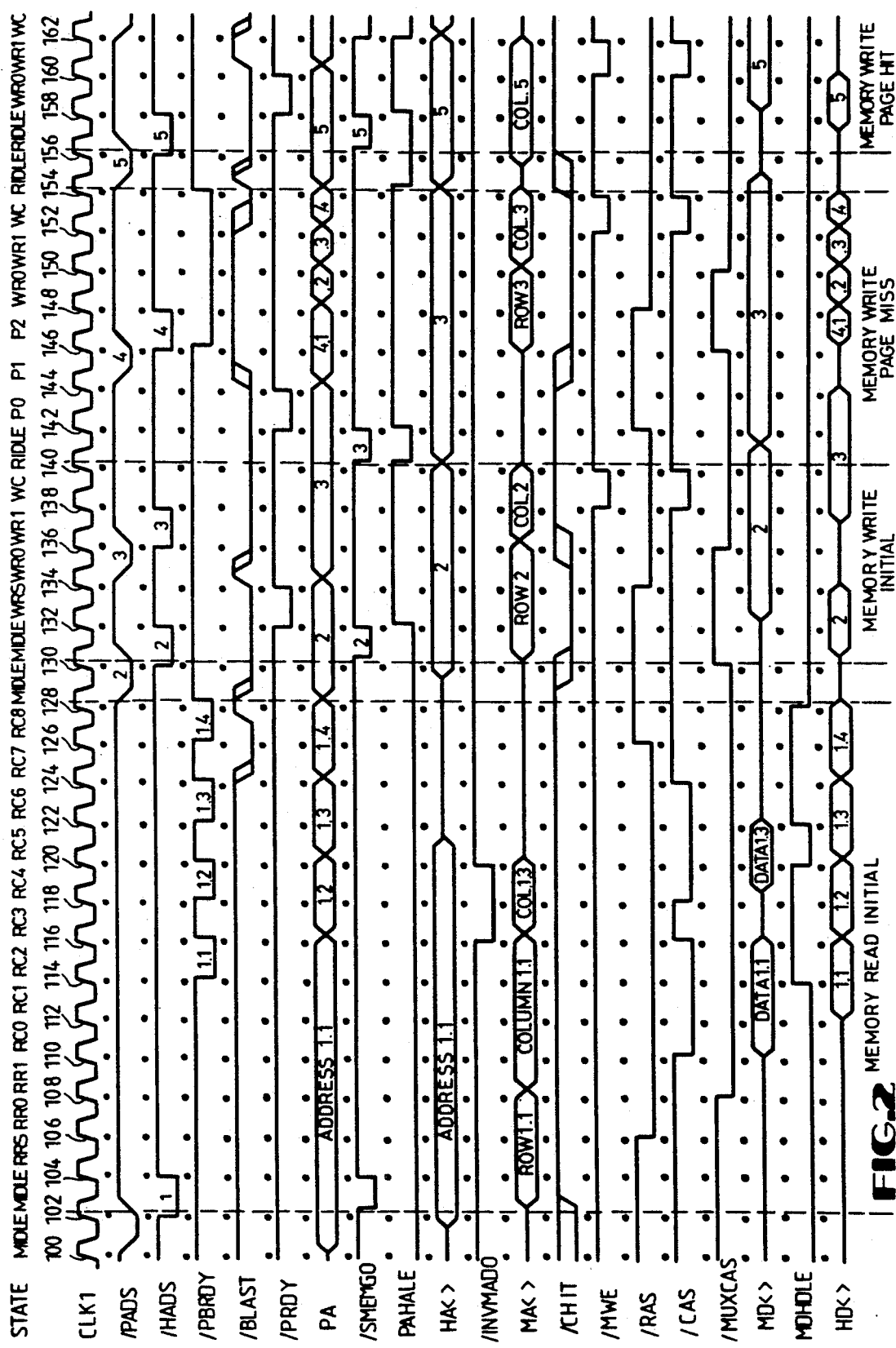
FIG. 2 is a timing diagram with the synchronous portion of the memory controller cooperating with the microprocessor.

FIG. 2 is a timing diagram of various cycles from the processor 20 to the system memory array 50. A state machine is utilized by the memory controller 48 and the state of this machine for each given clock cycle is indicated in the figure. More description of the state machine will be provided.

The basic clocking signal of the computer system C is the CLK1 signal, the clocking signal applied to the processor 20. In the preferred embodiment this is a 25 MHz signal for use with the 25 MHz version of the processor 20. At time 100, the rising edge of the CLK1 signal, the /PADS signal goes low, which is an indication by the processor 20 that address information is available for cycle 1. This address information is available on the processor address bus PA as shown. At time 102, the next rising edge of the CLK1 signal, the /HDAS signal goes low to indicate to the bus controller 34 that a valid address cycle is being performed. Also at this time the /SMEMGO signal goes low to indicate that a system memory cycle is commencing. This signal is used by the memory controller 48 to commence its operations. Also at time 102 the addresses present on the processor address bus PA and mapped by the memory mapper 36 are presented to the host address bus HA through the buffer/latch 38 and a latch 39 from the memory mapper 36, based on the control signals developed by the bus controller 34. These address signals on the host address bus are then passed through the latch 52 and the buffer 54 to the memory address bus MA for presentation to the memory devices.

At time 104, the next rising edge of the CLK1 signal, the /HADS signal goes high and the /SMEMGO signal goes high. At time 106, the next rising edge of the CLK1 signal, the /RAS or row address strobe signal goes low to indicate to the memory devices that a valid row address is present. At time 108, the next rising edge of the CLK1 signal, the /MUXCAS signal goes low so that the addresses for the column in the memory devices are presented to the memory devices. The /MUXRAS signal applied to the buffer 54 is not shown in the timing diagrams for clarity because it is simply the inverse of the /MUXCAS signal. Thus when the /MUXCAS signal is low column addresses are being provided and when it is high row addresses are being provided to the memory address bus MA.

At time 110, the next rising edge of the CLK1 signal the /CAS or column address strobe signal goes low to indicate to the memory devices that a valid column address is present and in this case data should be read from the memories because the /MWE signal is high. The memory data begins appearing on the memory data bus shortly thereafter. At time 112, the next rising edge of the CLK1 signal, the data which is appearing on the memory data bus and the first double word is presented to the host data bus HD. It is noted that the memory system 50 is preferably organized of 80 nsec page mode memory devices and is 64 bits wide so that when an address is presented to the system memory array 50 two double words are developed at one time, thus allowing selection of the appropriate buffer/latch 56 or 58 depending upon the desired double word. Thus at time 112 the proper latch 56 or 58 is enabled to present the first double word to the host data bus HD.

At time 114, the next rising edge of the CLK1 signal, the MDHDLE signal goes high, thus latching in the values on the memory data bus into the latches 56 and 58. This transition affects the latching because the latches 56 and 58 have inverted gating inputs. The system C can now start accessing the second quadruple word to be accessed in the burst cycle being performed by the processor 20 in this illustration. At a time shortly after time 114 the PBRDY signal goes low to indicate to the processor 20 that a burst access is ready and the processor can present the next address. This address is presented at time 116, the next rising edge of the CLK1 signal. An address change is presented by the processor but this address change is not presented to the host address bus HA because the preferred i486 processor 20 has a predefined order of obtaining bytes of data and the subsequent address can be predetermined based on the first address. Therefore only the original address is necessary for the remaining accesses of the burst operation. At time 116 the /INVMA00 signal goes low, which causes an inversion of the HA<3> signal which is translated to the least significant address bit for the system memory array 50. Thus the column address being presented to the memory address bus MA is changed to that of the third double word to be obtained. In order for this new column address to be recognized by the memory devices, at time 116 the /CAS signal goes high in preparation for strobing a new column address value into the memory devices. Finally at time 116 the other of the latches 56 and 58 is enabled so that the second double word is presented to the host data bus HD and to the processor 20.

At time 118, the next rising edge of the CLK1 signal, the /PBRDY signal again is triggered low to indicate to the processor 20 that the second set of data is available. Also at this time the /CAS signal goes low strobing in the next column addresses to the memory devices in the system memory array 50. This can be a short access because it is by definition a page hit based on the addresses presented by the processor 20. At time 120, the next rising edge of the CLK1 signal, the /PBRDY signal goes high and the next address is presented to the address bus PA by the processor 20. Also at this time the /INVMA00 signal goes high, thus ending the presentation of the address to the system memory array 50. At this time the data will begin to be valid from the memory devices and so the MDHDLE signal goes low to open the latches 56 and 58. The output enable inputs of the latches 58 and 56 are driven by the memory controller 48 so that the third double word is presented to the host data bus HD.

At time 122 the next rising edge of the CLK1 signal, the /PBRDY signal goes low to indicate to the processor 20 that the next double word is available and the MDHDLE signal goes high, thus latching in the data which has been presented on the memory data bus MD. At time 124, the next rising edge of the CLK1 signal, the /PBRDY signal goes high in preparation for the next cycle and the /CAS signal goes high, ending the read operation of the memory devices. Also at this time the fourth double word of data is presented to the host data bus HD by changing the output enables of the buffer/latches 56 and 58. After time 124 the processor 20 indicates that this is the last access in the burst access by lowering the /BLAST signal.

At time 126, the next rising edge of the CLK1 signal, the /PBRDY signal is lowered to indicate to the processor 20 that the cycle is complete and the /RAS signal goes high so that the next row address can be strobed into the memory devices. At time 128, the next rising edge of the CLK1 signal, the /PBRDY signal goes high, the final address provided by the processor 20 is removed from the processor address bus PA with the addresses of cycle 2 being presented, and the /BLAST signal goes high, thus indicating that the burst cycle is completed. At time 128 the MDHDLE signal is lowered so that any data which is present from the memory devices in the memory array 50 can be presented through the buffer/latches 56 and 58.

Additionally at time 128 the processor 20 lowers the PADS signal to indicate that a new address is present and thus cycle 2 is beginning. This will be a single double word access as indicated by the fact that the /BLAST signal goes low at this time. This cycle is considered an initial memory operation because a full burst read operation has been completed. At time 128 the processor 20 presents the new addresses for cycle 2 onto the processor address bus PA. At time 130, the next rising edge of the CLK1 signal, the /PADS signal is raised by the processor 20 and the /HADS signal, which indicates that a valid address will be present on the host address bus HA, is lowered. Also shortly after this time, based on propagation delays, the /SMEMGO signal is lowered to indicate that a memory cycle is starting. Also at time 130 the address values for cycle 2 begin appearing on the host address bus HA and shortly thereafter the row addresses appear on the memory address bus MA through the buffer 54. The row addresses appear because the /MUXRAS signal is lowered at this time and the /MUXCAS signal is raised so that the column addresses are not presented to the system memory array 50 in conflict with the row address. At time 130 the not cache hit or /CHIT signal is lowered to indicate that a cache hit is present. Finally at time 130 the data begins appearing from the processor 20 onto the host data bus HD.

At time 132, the next rising edge of the CLK1 signal, the /HADS signal is raised. At this time the /PRDY signal is lowered to indicate that this will not be a burst response. Additionally, at time 132 the /SMEMGO signal is raised and the PAHALE signal is raised to latch the data present on the host data bus HD and the addresses present on the processor address bus PA into the appropriate latches 38, 56 and 58. Also at this time the data appearing on the processor data bus PD begins appearing on the memory data bus MD.

At time 134, the next rising edge of the CLK1 signal, the processor lowers the /PADS signal to begin cycle 3, which it can do because it has been given an indication that the memory system has been ready. This commences the address portion of cycle 3 by the processor 20. At this time the /BLAST signal goes high so that it can be lowered if necessary on the next CLK1 signal cycle. Also at this time the /PRDY signal goes high to complete the ready indication and new addresses are presented onto the processor address bus PA. At time 134 the /RAS signal is lowered now that the precharge time has been completed and thus the row addresses of cycle 2 are strobed into the memory device. Also at this time the data of cycle 2 is removed from the host data bus HD by the processor 20.

At time 136, the next rising edge of the CLK1 signal, the /PADS signal is raised and the /HADS signal is lowered. The /BLAST signal is low to indicate that this is only a single double word transfer. Additionally at this time the addresses being presented to the memory devices and the memory array 50 are changed to the column addresses with the /MUXCAS signal going low and the /MUXRAS signal going high to allow this to happen. At time 138, the next rising edge of the CLK1 signal, the /HADS signal goes high. Additionally at this time the /MWE and /CAS signals go low so that the data which is appearing on the memory data bus is written into the memory devices at the column address provided and latched. The memory devices of the preferred embodiment latch the row address, column address and data on the falling edge of the appropriate strobe. Also at time 138 the processor 20 provides the data of cycle 3 to the host data bus HD. At time 140, the next rising edge of the CLK1 signal, the SMEMGO signal is lowered to indicate to the system that the third memory cycle, which is a memory write page miss operation, is commencing. At this time the PAHALE signal goes low to allow new data to be transferred into the latches 38, 56 and 58. Therefore at this time the values present on the host address bus HA change to those of cycle 3. Additionally, at time 140 the /CAS signal goes high.

At time 142, the next rising edge of the CLK1 signal, the /PRDY signal is lowered to indicate to the processor 20 that cycle 3 will complete and at this time the /SMEMGO and PAHALE signals are raised, thus causing the data to be latched into the latches 38, 56 and 58. Also at this time the new row addresses for cycle 3 are presented to the memory address bus MA and the /RAS signal is raised to allow a precharge time. The new row address is necessary because this has been a page miss operation and thus a full address needs to be developed. Additionally at this time the data for cycle 3 is presented onto the memory data bus MD.

At time 144, the next rising edge of the CLK1 signal, the processor 20 lowers the /PADS signal to indicate that the next cycle will be developing. In this case cycle 4 is a cache read hit and therefore cycle 4 is completely transparent to the system memory array 50 but is shown to illustrate that processor cycles can perform concurrently with memory cycles. At time 144 the /BLAST signal is raised by the processor 20 and the /PRDY signal is raised by the memory controller 48.

At time 146, the next rising edge of the CLK1 signal, the processor 20 raises the /PADS signal and the bus controller 34 lowers the /HADS signal to indicate the next cycle. Because this is a cache read hit shortly after time 146 the /PBRDY signal goes low to indicate that the burst access mode will be utilized. Also at this time the /CHIT signal goes low to indicate the cache hit situation. Shortly after this time the data begins appearing on the host data bus HD for the burst cycle. Additionally, at time 146 the /MUXCAS signal is raised and the /MUXRAS signal lowered so that the row addresses of cycle 3 are presented to the memory devices.

At time 148, the next rising edge of the CLK1 signal, the /HADS signal is raised for cycle 4. Also at time 148 the /RAS signal is lowered to strobe in the row addresses of cycle 3 to the memory devices. At time 150, the next rising edge of the CLK1 signal, the /MUXCAS signal is lowered, and therefore the /MUXRAS signal is raised, so that the column addresses are presented to the memory address bus MA. At time 152, the next rising edge of the CLK1 signal, the /MWE and /CAS signals are lowered so that the column addresses and data are strobed into the memory devices. At time 154, the next rising edge of the CLK1 signal, the /BLAST signal is low from the processor 20 indicating that cycle 4, which was transparent to the system memory array 50, is completing. Thus at this time the PAHALE signal is lowered to allow new data and addresses to be presented to the respective buses. At time 154 the /MWE and /CAS signals are raised to terminate the write operation to the memory devices MD with the data being removed from the memory data bus shortly thereafter. Also at time 154 the processor 20 lowers the /PADS signal to indicate that cycle 5 addresses are present on the processor address bus PA. At time 156, the next rising edge of the CLK1 signal, the /PADS signal is raised by the processor 20 and the /HADS signal is lowered by the bus controller 34 to indicate the beginning of the next cycle, in this case a memory write page hit operation which is performed in a relatively short interval. Additionally at time 156 the /SMEMGO signal is lowered to indicate the start of a system memory array cycle.

At time 158, the next rising edge of the CLK1 signal, the /HADS signal is raised and the /PRDY signal is lowered. Additionally at this time the /SMEMGO signal is raised. Also at this time the PAHALE signal is raised to store the data into the latches 38, 56 and 58. At time 160, the next rising edge of the CLK1 signal, the /PRDY signal is raised, the /MWE signal is lowered and the /CAS signal is lowered. Only column addresses are presented to the memory array 50, in this case starting at time 156, because it is a page hit operation. Therefore only the /CAS signal needs to be strobed, with the /RAS signal remaining low. Thus at time 162, the next rising edge of the CLK1 signal, the /MWE and /CAS signals go high. The next cycle, which is not shown, starts at time 162.

Thus it can be seen that the synchronous portion of the memory controller 48 allow burst operations to occur in the case of reads and allows posted write operations so that concurrent processor and system memory array operations can occur. It is also noted that memory page miss operations require a number of wait states, while memory write page hit operations require only one wait states to the processor 20.

Figure 3:
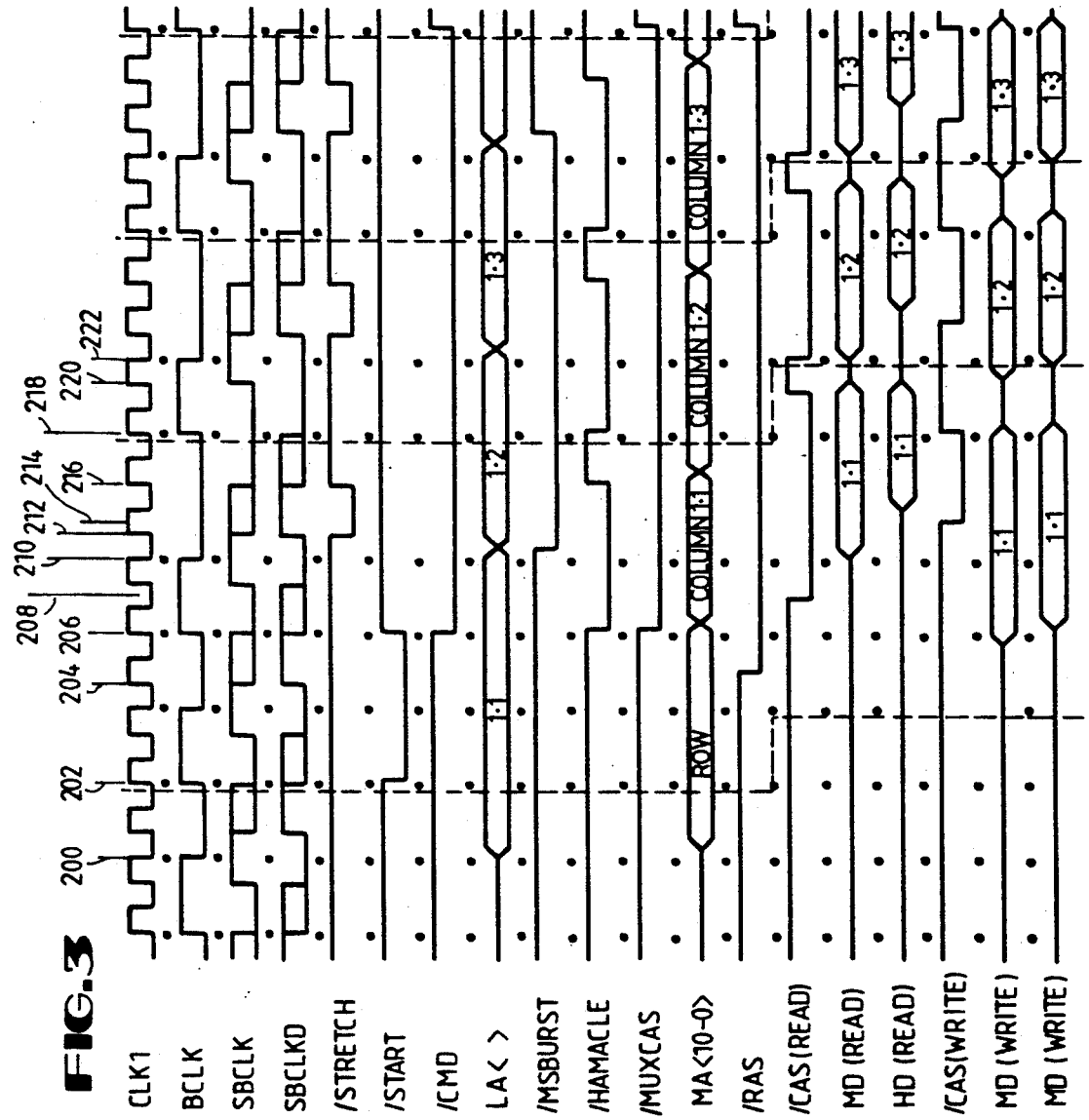
FIG. 3 is a timing diagram of the asynchronous portion of the memory controller cooperating with the EISA bus.

This has been the timing for the synchronous portion of the memory controller 48 for use with the processor 20. The memory controller 48 also includes an asynchronous portion for use with the EISA bus 44. The basic clock of the EISA bus 44 is the BCLK signal as shown in FIG. 3. The BCLK signal is developed from the CLK1 signal by the bus controller 34. It is divided based on the processor clock speed. In the case of the preferred embodiment the CLK1 signal of 25 MHz is divided by 3. The bus controller 34 includes a /STRETCH input to allow one phase of the BCLK signal to be increased or stretched while the /STRETCH signal is low.

At time 200, the falling edge of the BCLK signal the memory addresses are presented onto the EISA address bus LA. Also at this time /HAMACLE signal provided to the column address latch 52 is high. Shortly after time 200 the row addresses begin appearing on the memory addresses bus MA because the /MUXRAS signal is low and the /MUXCAS signal is high. The address values were transferred from the EISA bus LA through the latch 40 to the host address bus HA and then to the memory address bus MA through the buffer 54. At time 202, the next rising edge of the BCLK signal, the /START signal goes low to indicated that valid memory addresses are present and the memory address of the cycle is commencing. At time 204, a period shortly after the next falling edge of the BCLK signal, the /RAS signal goes low to strobe the row addresses into the memory devices. The /RAS signal goes low at this time based on a delayed version of the BCLK signal developed through a delay line. At time 206, the next rising edge of the BCLK signal, the /START signal goes high and the /CMD signal goes low, thus indicating the beginning of the data portion of the cycle. At this time the column addresses are presented to the memory address bus MA when the /MUXCAS signal goes low. Also at this time if a write cycle is occurring, the data appears on the host data bus HD and then shortly thereafter appears on the memory data bus MD because the PAHALE signal is low, thus making the latches 56 and 58 transparent and the /HDMDOE signal is low so that the outputs are driven onto a memory data bus for a write condition. At time 208, a time based on a delay from the falling edge of the /CMD signal, the /CAS signal goes low in a read operation to latch in the column addresses to the memory devices. At time 210, approximately the next falling edge of the BCLK signal, new addresses are presented onto the EISA address bus LA and the /MSBURST signal goes low to indicate that this will be a burst operation. If the cycle being performed is a read cycle, at this time the valid data begins appearing from the memory devices to the memory data bus MD. At the next rising edge of the CLK1 signal at time 212, the /STRETCH signal goes low to indicate to the bus controller 34 that the BCLK signal should be extended to allow additional time for the memory access. The /STRETCH signal is developed on a combination of two delayed signals based on the BCLK signal. The first delay signal, the SBCLK signal, is the BCLK signal as registered by a flip-flop clocked by the CLK1 signal. The second delay signal, the SBCLKD signal, is the SBCLK signal registered by a flip-flop also clocked by the CLK1 signal. While this delay is developed using sequencial logic and flip-flops it is noted that it could be developed using a delay line.

At time 214, a time which is also based on a delay from the /CMD signal, the /CAS signal goes low if a write operation is being performed. This latches in the column address and the data, to the memory devices, the /MWE signal having previously been lowered. At time 216, the next rising edge of the CLK1 signal, the /STRETCH signal is raised so that only a single CLK1 cycle extension is added to the BCLK signal. Based on the removal of the /STRETCH signal the /HAMACLE signal goes high. This passes the column addresses of cycle 2 to the memory address bus MA.

At time 218, the next rising edge of the BCLK signal, the /CAS signal is raised in write cycles to terminate the particular cycle, thus effectively completing the memory operation. Also at this time the /HAMACLE signal goes low, latching the column address values into the column address latch 52. At time 220, which is based on a delayed time from the BCLK signal, the /CAS signal goes high in read operations, thus terminating the read cycle. Thus at this time the data values are removed from the memory data bus MD and the host data bus HD in read cycles. At time 222, the next falling edge of the BCLK signal, the /CAS signal goes low for read operations and the data for write operations begins appearing on the host data bus HD and is transferred to the memory data bus MD. Also at this time the address values for cycle 3 are presented on the EISA address bus LA. The remaining portions of cycle 2 complete from this point as the operation of cycle 1 after time 210. The timings of cycle 3, which is also a burst operation, are similar to those of cycle 2.

Figure 4:
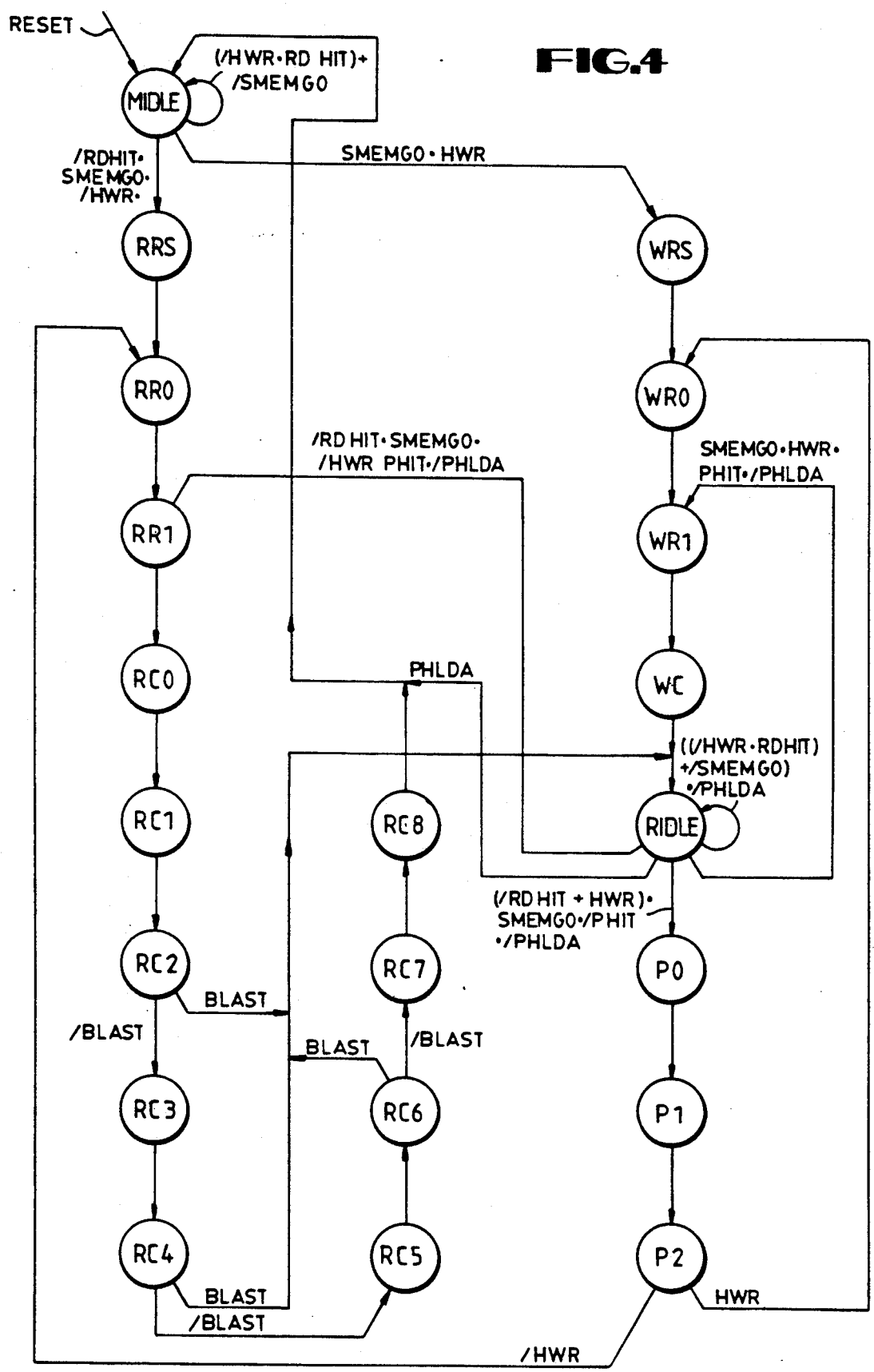
FIG. 4 is a state machine for use in the synchronous portion of the memory controller.

The state machine used with the memory controller 48 to control the processor 20 accesses to the system memory array 50 is shown in FIG. 4. The state machine is clocked on the rising edge of the CLK1 signal. Operation of the state machine starts at state MIDLE upon reset. The MIDLE state, the idle state with the /RAS signal high, is used in initial operations, such as reset, after the processor has been held and has just regained control of the bus, and after cache line fill operations. Control remains at state MIDLE if there is a cache read hit or until the /SMEMGO signal goes low to indicate that a memory cycle is commencing. If the SMEMGO signal is high, that is, the /SMEMGO signal is low, it is a read operation and not a hit into the cache, control proceeds to state RRS on the next rising edge of the CLK1 signal. On the next rising edge of the CLK1 signal control proceeds to state RR0 and then to states RR1, RC0, RC1 and RC2 on successive rising edges of the CLK1 signal.

There are two exits from state RC2. If the /BLAST signal is high, indicating that more addresses in a burst are to be developed, control proceeds to state RC3 and then to state RC4. State RC4 has two exit conditions, based on the state of the /BLAST signal. If the /BLAST signal is high, control proceeds to state RC5 and to state RC6 on succeeding rising edges of the CLK1 signal. Control proceeds from state RC6 to RC7 on the next rising edge of the CLK1 signal if the /BLAST signal is high. Control then proceeds from state RC7 to state RC8 and from state RC8 to state MIDLE. If in states RC2, RC4 or RC6 the /BLAST signal was low, thus indicating that the processor 20 is presenting the last address in a burst operation, control proceeds to state RIDLE.

If the SMEMGO signal was high and a write operation was occurring, then control proceeds from state MIDLE to state WRS. On successive CLK1 signal rising edges, the state machine progresses from state WRS to state WR0 to state WR1 to state WC to state RIDLE.

There are numerous exits from state RIDLE, which is the main idle state with the /RAS signal held low and is used while the processor has control of the bus. Control remains in state RIDLE while the processor is not held until the /SMEMGO signal goes low, indicating the start of a memory cycle, or if a cache read hit is occurring. Control proceeds from state RIDLE to state WR1 if a memory operation is to commence, it is a write operation, it is a memory page hit and the processor 20 is not being held. This is shown in cycle 5 in FIG. 2 for a memory write page hit operation. If a cache miss, memory page hit operation which is a read operation is occurring, and the processor 20 is not holding, control proceeds from state RIDLE to state RR1 when the SMEMGO signal is presented. If the processor 20 is entering a hold state as indicated by the presence of the PHLDA signal, an indication that the DMA controller or other bus master will be taking control of the EISA bus and thus also the host bus, control proceeds from state RIDLE to state MIDLE so that the next processor memory operation will be an initial cycle.

A RAS precharge time path is provided in the state machine for page miss operations from state RIDLE. If the processor 20 is not in hold, a memory operation is commencing as indicated by the SMEMGO signal, the operation is not a page hit and the operation is either a write or not a cache hit, then control proceeds from state RIDLE to state P0. Control then proceeds from state P0 to state P1 to state P2 on successive CLK1 rising edges to provide the RAS precharge time. If it is a read operation, control proceeds from state P2 to state RR0, while if it is a write operation control proceeds from state P2 to state WR0. Thus the three states P0, P1 and P2 are provided to allow for the RAS precharge time for the memory devices.

The various states of the state machine are utilized in combination with other circuitry to develop the buffer and latch enabling and gating signals and the row address and column address strobe signals presented to the memory devices. The general arrangement in the preferred embodiment is to have these combinatorial or sequential operations performed in programmable array logic (PAL) devices.

The row address strobes provided to the memory devices are developed by two programmable array logic (PAL) devices 300 and 302. The ERAS PAL 300 provides the signals /RASA and /RASB for the two banks of memory during asynchronous operation and the PRAS PAL 302 provides the /RAS and /RASB during processor cycles. In addition, the PRAS PAL 302 provides the /INVMA00 signal used in predetermining the address of the second quadruple word to be obtained during processor burst cycles. The /RASA and /RASB signals as provided by the ERAS PAL 300 are enabled by the HHLDA signal, which is high when the processor 20 is on hold and low when the processor is active. The RASA and RASB signal and a signal referred to as STARTHO are developed using the following equation:

```
RASA  =  START · /BCLK · /BCLKD30 · SYSMEM
              · M-IO · /EMSTR16 · /REFRESH
          + RASA · STARTHO
          + RASA · CMD
          + MWTC · SYSMEM · EMSTR16 · /REFRESH
          + MRDC · SYSMEM · EMSTR16 · /REFRESH
          + MRDC · REFRESH

RASB  =  START · /BCLK · /BCLKD30 · SYSMEM
              · M-IO · /EMSTR16 · /REFRESH
          + RASA · STARTHO
          + RASA · CMD
          + MWTC · SYSMEM · EMSTR16 · /REFRESH
          + MRDC · SYSMEM · EMSTR16 · /REFRESH
          + MRDC · REFRESH · RASAD30
```

-continued

```
STARTHO  =  START
            + STARTHO · /BCLKD30
```

The START, CMD, MWTC, MRDC and REFRESH signals are those provided on the EISA bus. The SYSMEM signal is a signal provided by the memory mapper 36 which indicates that the memory operation is to be performed by memory devices located in the system memory array 50. The EMSTR16 signal is a signal provided by the bus controller 34 which indicates that an ISA master is providing the signals, indeference to an EISA master or the DMA controller located in the ISP 46. The BCLKD30 signal is a 30 nsec delayed version of the BCLK signal and is preferably developed using a delay line. The RASAD30 signal is similarly a version of the RASA signal which has been delayed 30 nsec by a delay line 304. The STARTHO signal is used to provide a signal to allow the RASA and RASB signals to be stable over the START signal to CMD signal transition. In the RASA and RASB equations for the ERAS PAL 300 the first term is used to initiate the signal for EISA masters, the second term is provided to hold over the START signal to CMD signal transition, and the third term is used to hold the signal to the end of the CMD signal. The fourth and fifth terms are used when an ISA master is in control of the bus. The final term is used for refresh operations. It is noted that the RASB refresh term is phased to start slightly later than the RASA term to reduce current spikes produced by the memory devices in the system memory array 50. Additionally the ERAS PAL 300 produces a signal referred to as /EXFRC, the equation of which is as follows:

```
EXFRC  =  START
          + CMD · MSBURST
```

This equation indicates that an EISA cycle has started or a burst cycle is in operation.

When the HHLDA signal is low, indicating that the processor 20 is in control of the bus, then the /RASA and /RASB signal are provided by the PRAS PAL 302. This is because the HHLDA signal is connected to the inverted output enable input of the PAL 302. It is noted that the PAL 302 is a registered PAL, that is, it contains flip-flops. The CLK1 signal is provided to the clocking input of the PAL 302 as the clocking input for the various flip-flops. The equation for the generation of the RASA and RASB signals in the PRAS PAL 302 are as follows:

```
RASA  :=  (RIDLE + WRS + WR0 + WR1) · /SMEMGO · /XHLDA
        + (RIDLE + WRS + WR0 + WR1) · RDHIT · /XHLDA
        + (RIDLE + WRS + WR0 + WR1) · PHIT · /XHLDA
        + (WRS + WR0 + RC4 + RC5) · /XHLDA
        + (RRS + RR0 + RC0 + RC1) · /XHLDA
        + (RC0 + RC1 + RC2 + RC3) · /XHLDA
        + (WR1 + WC) · /XHLDA
        + (RR1 + RC2 + P2 + RC6) · /XHLDA
```

-continued
```
RASB := (RIDLE + WRS + WR0 + WR1) · /SMEMGO · /XHLDA
      + (RIDLE + WRS + WR0 + WR1) · RDHIT · /XHLDA
      + (RIDLE + WRS + WR0 + WR1) · PHIT · /XHLDA
      + (WRS + WR0 + RC4 + RC5) · /XHLDA
      + (RRS + RR0 + RC0 + RC1) · /XHLDA
      + (RC0 + RC1 + RC2 + RC3) · /XHLDA
      + (WR1 + WC) · /XHLDA
      + (RR1 + RC2 + P2 + RC6) · /XHLDA
```

The /SMEMGO signal is a signal, which when low indicates that a memory cycle should commence and its development will be explained later. The RDHIT signal is provided by another PAL and is an indication that a cache memory read hit has occurred. The PHIT signal is an indication that a page hit has occurred in the memory devices and thus the row access and addressing need not be performed. The /XHLDA signal indicates that the processor 20 is in a hold state, as indicated either by a HOLD signal request acknowledged by HLDA signal, or an address hold or AHOLD signal asserted. The PRAS PAL 302 has five input signals MS<4-0> which when decoded form the various states of the state machine. The state identifications have been used in the equations for clarity.

Also developed in the PASR PAL 302 is the /INVMA00 signal. The equation for this signal is as follows:

$$INVMA00 := RC2 + RC3$$

In a similar manner the /CASA<3-0> and /CASB<3-0> signals are developed from an ECAS PAL 306 and an PCAS PAL 308. Again the ECAS PAL 306 is used during asynchronous operations based on the state of the HHLDA signal being high and the PCAS PAL 308 drives the lines when the HHLDA signal is low, indicating that the processor has control of the bus. The equations for the /CASA<3-0> and /CASB<3-0> signals as produced by the ECAS PAL 306 are as follows:

```
CASA<n> =  /EMSTR16 · DRAS60 · /LW-R · /REFRESH · /MSBURST
         + /EMSTR16 · DRAS60 · /LW-R · /REFRESH · BCLKD30
         + /EMSTR16 · DRAS60 · /LW-R · /REFRESH · /BCLK
         + /EMSTR16 · /BCLKD30 · DRAS60 · LW-R
              · /LLA02 · LBE<n> · /REFRESH · EXFR
         + EMSTR16 · /REFRESH · DRAS60 · LBEn · /LLA02

CASB<n> =  /EMSTR16 · DRAS60 · /LW-R · /REFRESH · /MSBURST
         + /EMSTR16 · DRAS60 · /LW-R · /REFRESH · BCLKD30
         + /EMSTR16 · DRAS60 · /LW-R · /REFRESH · /BCLK
         + /EMSTR16 · /BCLK · /BCLKD30 · /DRAS · LW-R
           · LLA02 · LBEn · /REFRESH · EXFR
         + EMSTR16 · /REFRESH · DRAS60 · LBE<n> · LLA02
```

The DRAS60 signal is produced as the output of a two input OR gate 310 whose inputs are the /RASA signal and a version of the /RASA signal that has been delayed 60 nsecs by a delay line 312. The LW-R signal is a latched version of the W-R signal present on the EISA bus and is used to indicate read or write operation status during the entire cycle. The lower case n in the equations signifies that the equation is for the appropriate byte lane or bit position in the /CASA<3-0> signals as based on the associated /LBE<3-0> signal. The L on the /LBE<3-0> signal indicates that this is a latched version of the byte enable signal so that these values may remain during the entire cycle. The LLA02 signal is a latched version of the LA<2> signal that is the bit position 2 address value as present on the EISA bus. This signal is used to switch between the banks A and B of the system memory array 50 as can be seen by the two sets of equations. The /EXFR signal is provided by the noninverted output of a flip-flop 314 D-type flip-flop 314 whose the D-input is connected to the /EXFRC signal and whose clocking input is connected to the BCLK signal. The first term of the equation starts the /CAS signal for EISA read cycles, the second term continues it over the BCLK signal rising and falling transitions, and the third term continues the signal between the BCLK signal transitions. The fourth term is used for EISA writes, while the fifth term is used for ISA masters.

The /CASA<3-0> and /CASB<3-0> signals are also produced by the PCAS PAL 308 when the processor is in control of the bus. The equations utilized to develop these signals are as follows:

```
CASA<n> := (RC0 + RC1 + RC4 + RC5) · /BLAST
         + (RC0 + RC3)
         + WR1 · /HWP · HBE<n> · /HA02
         + (RC1 + RC5)
         + RR1

CASB<n> := (RC0 + RC1 + RC4 + RC5) · /BLAST
         + (RC0 + RC3)
         + WR1 · /HWP · HBE<n> · HA02
         + (RC1 + RC5)
         + RR1
```

The /BLAST signal indicates that the burst cycle is not completing while the HWP is a write protect signal developed by the memory mapper 36 and is used write protect desired areas. The HBE signals, as appropriate for the particular byte lane as indicated by the lower case n, are the byte enable signals present on the host bus. The HA02 signal is the bit position 2 signal on the host address bus HA. The PCAS PAL 308 is clocked by the CLK1 signal and is a registered design to allow the synchronous portion of the memory controller 48 to operate. The PCAS PAL 308 also includes as inputs the MS<4-0> signals, but again the states are shown in the equation.

Figure 5:
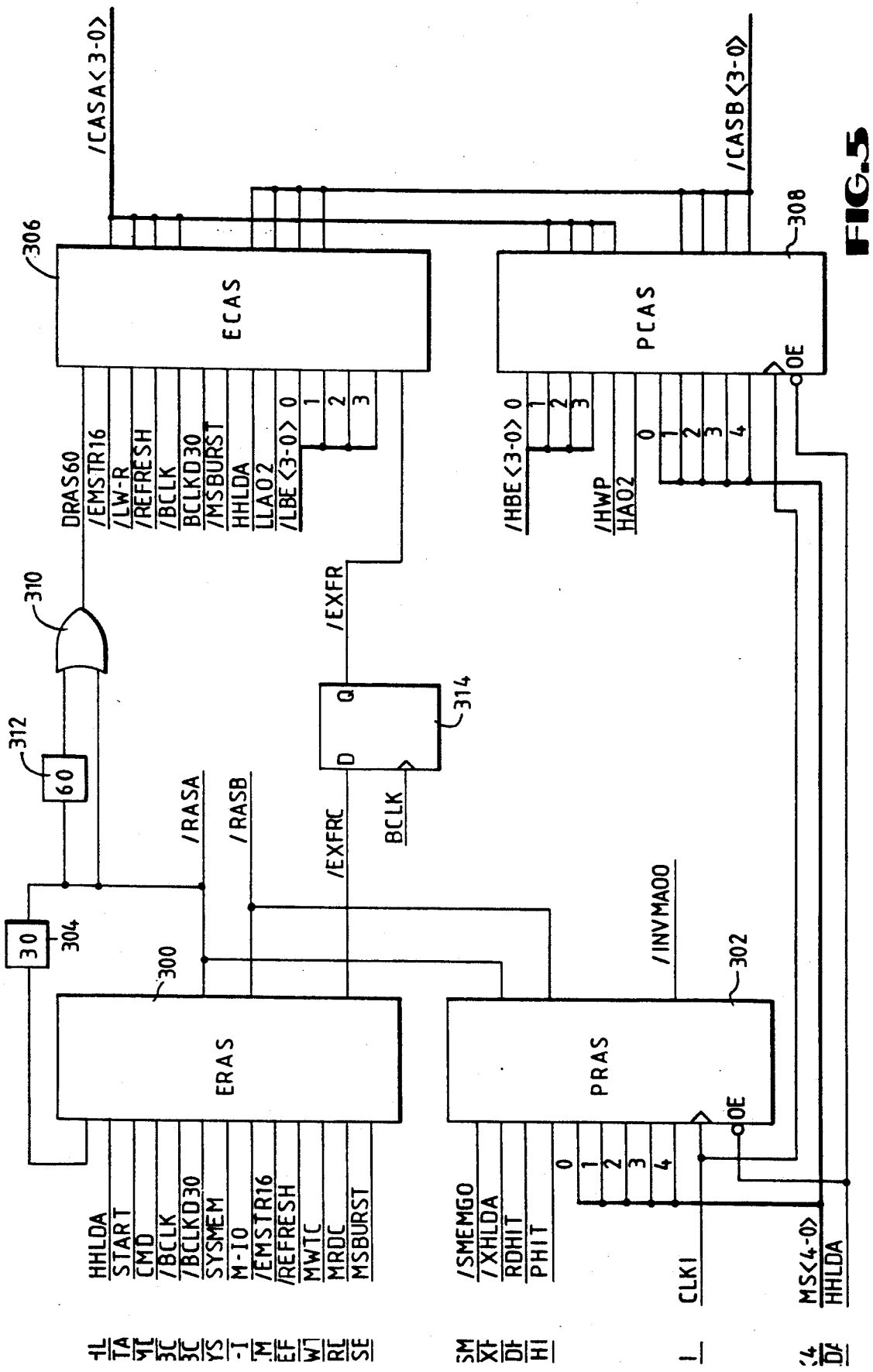
FIGS. 5, 6 and 7(a)-(e) are detailed schematics of portions of the memory controller according to the present invention.
Figure 6:
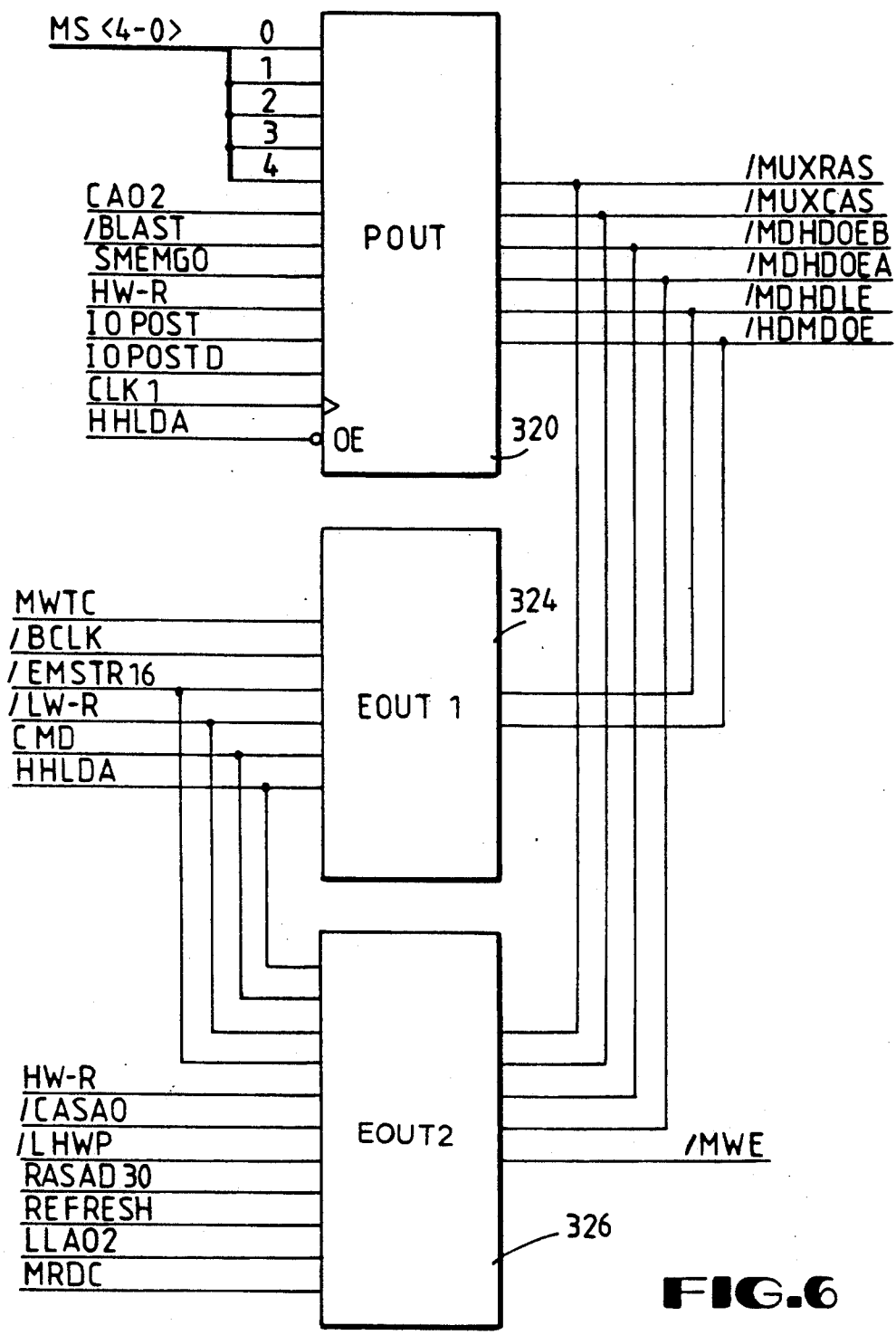

In addition, various PAL's are used to develop the buffer and latch control signals. The first of these PAL's is the POUT PAL 320 (FIG. 5). The POUT PAL 320 is a registered PAL having internal flip-flops which are clocked by the CLK1 signal. The inverted output enable input of the POUT PAL 320 is connected to the HHLDA signal so that when the processor is active, that is the HHLDA signal is low, the POUT PAL 320 is driving the output signals. The equations for the various signals developed by the POUT PAL 320 are as follows:

$$
\begin{aligned}
\text{MUXCAS} := &\ (\text{RIDLE} + \text{WR1} + \text{WC}) \\
&+ (\text{RC0} + \text{RC1} + \text{RC2} + \text{RC3}) \\
&+ (\text{P0} + \text{RC4} + \text{RC7}) \\
&+ (\text{RC3} + \text{RC7} + \text{RC8}) \\
&+ (\text{RR0} + \text{RR1} + \text{RC1} + \text{RC2}) \\
&+ (\text{RC1} + \text{RC2} + \text{WR0} + \text{RC5} + \text{RC6})
\end{aligned}
$$

$$
\begin{aligned}
\text{MUXRAS} := &\ (\text{MIDLE} + \text{RAS}) \\
&+ \text{WRS} \\
&+ (\text{P1} + \text{P2})
\end{aligned}
$$

$$
\begin{aligned}
\text{MDHDOEA} := &\ (\text{RC0} + \text{RC1}) \cdot /\text{CA02} \\
&+ \text{RC4} \cdot /\text{CA02} \cdot /\text{BLAST} \\
&+ \text{RC5} \cdot /\text{CA02} \\
&+ \text{RC2} \cdot \text{CA02} \cdot /\text{BLAST} \\
&+ \text{RC3} \cdot \text{CA02} \\
&+ \text{RC6} \cdot \text{CA02} \cdot /\text{BLAST} \\
&+ \text{RC7} \cdot \text{CA02}
\end{aligned}
$$

$$
\begin{aligned}
\text{MDHDOEB} := &\ (\text{RC0} + \text{RC1}) \cdot \text{CA02} \\
&+ \text{RC4} \cdot \text{CA02} \cdot /\text{BLAST} \\
&+ \text{RC5} \cdot \text{CA02} \\
&+ \text{RC2} \cdot /\text{CA02} \cdot /\text{BLAST} \\
&+ \text{RC3} \cdot /\text{CA02} \\
&+ \text{RC6} \cdot /\text{CA02} \cdot /\text{BLAST} \\
&+ \text{RC7} \cdot /\text{CA02}
\end{aligned}
$$

$$
\begin{aligned}
\text{HDMDOE} := &\ \text{IOPOST} \\
&+ (\text{WR0} + \text{WR1}) \\
&+ \text{RIDLE} \cdot \text{SMEMGO} \cdot \text{HW-R}
\end{aligned}
$$

$$
\begin{aligned}
\text{MDHDLE} := &\ \text{RC1} + \text{RC2} + \text{RC3} + \\
&\ \text{RC5} + \text{RC6} + \text{RC7}
\end{aligned}
$$

Figure 7A:
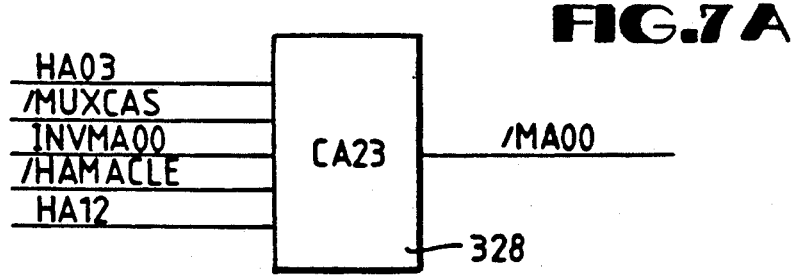
Figure 7B:
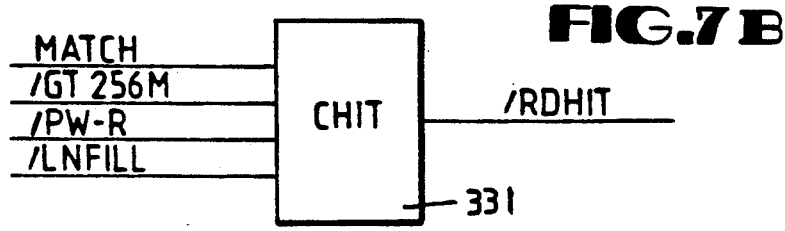

The IOPOST signal is developed as an output of the POST PAL 322 (FIG. 7D), which development will be discussed later. The CA02 signal is a latched version of the bit 2 position of the processor address bus PA. The MS<4-0> signals were provided to the POUT PAL 320 for state determination. The /MDHDOEA and /MDHDOEB signals are similar except for the state of the CA02 signal, so that the outputs of the latches 56 and 58 are enabled in an alternating sequence.

Two PAL's 324 and 326, respectively the EOUT1 and EOUT2 PAL's, are used to develop these buffer and latch control signals for asynchronous operations. The HHLDA signal is an input to both EOUT1 and EOUT2 PAL's 324 and 326 to control the outputs. When the HHLDA signal is high, indicating that the processor is not in control of the bus, the asynchronous EOUT1 and EOUT2 PAL's 324 and 326 drive the lines and are disabled or tristated when the HHLDA signal is low. The equation for the logic in the EOUT1 PAL 324 is as follows:

$$
\text{MDHDLE} = 0
$$

$$
\begin{aligned}
\text{HDMDOE} = &\ /\text{EMSTR16} \cdot \text{CMD} \cdot \text{LW-R} \\
&+ \text{EMSTR16} \cdot \text{MWTC}
\end{aligned}
$$

Thus, the latches 56 and 58 are always gated or transparent from the memory data bus MD to the host data bus HD during asynchronous operations and the outputs are enabled from the latches 56 and 58 to the system memory array 50 during the data portions of write operations.

The EOUT2 PAL 326 develops the /MUXRAS, /MUXCAS, /MDHDOEB and /MDHDOEA signals for use by the buffers and latches and additionally produces the /MWE signal which is applied to the write enable inputs of the memory devices in the system memory array 50. The equations developed in the EOUT2 PAL 326 are as follows:

$$
\begin{aligned}
\text{MUXCAS} = &\ \text{CMD} \cdot /\text{EMSTR16} \\
&+ \text{RASAD30} \cdot \text{EMSTR16} \\
&+ \text{REFRESH}
\end{aligned}
$$

$$
\begin{aligned}
\text{MUXRAS} = &\ /(\text{CMD} \cdot /\text{EMSTR16} \\
&+ \text{RASAD30} \cdot \text{EMSTR16} \\
&+ \text{REFRESH})
\end{aligned}
$$

$$
\begin{aligned}
\text{MDHDOEA} = &\ /\text{EMSTR16} \cdot /\text{LW-R} \cdot \text{CASA0} \cdot /\text{LLA02} \\
&+ \text{EMSTR16} \cdot \text{MRDC} \cdot /\text{LLA02}
\end{aligned}
$$

$$
\begin{aligned}
\text{MDHDOEB} = &\ /\text{EMSTR16} \cdot /\text{LW-R} \cdot \text{CASA0} \cdot \text{LLA02} \\
&+ \text{EMSTR16} \cdot \text{MRDC} \cdot \text{LLA02}
\end{aligned}
$$

$$
\begin{aligned}
\text{MWE} = &\ \text{HW-R} \cdot /\text{HHLDA} \cdot /\text{CASA0} \\
&+ \text{LW-R} \cdot \text{HHLDA} \cdot /\text{CASA0} \cdot /\text{LHWP} \\
&+ \text{MWE} \cdot \text{CASA0} \\
&+ \text{HW-R} \cdot /\text{HHLDA} \cdot \text{MWE} \\
&+ \text{LW-R} \cdot \text{HHLDA} \cdot \text{MWE} \cdot /\text{LHWP}
\end{aligned}
$$

The four buffer and latch signals have their tristate controls developed by the HHLDA signal, whereas the /MWE signal is always driven by the EOUT2 PAL 326 for both synchronous and asynchronous cycles. The LPWP signal is a latched version of the write protect signal provided by the memory mapper 36. The first term of the MWE signal equation is provided for synchronous cycles from the processor, while the second term is provided for asynchronous cycles from the EISA bus 44 or the ISP 46. The third term is provided so that read/modify/write cycles are not performed by the memory devices and the final two terms are provided for deglitching.

A number of other PALS are utilized to develop some of the signals necessary to drive the latches 56 and 58 and for signals utilized by the previously described PAL's. The CS23 PAL 328 (FIG. 7A) develops the /MA00 signal which is the least significant bit of the memory address. This signal is developed by a PAL 328 because during burst operations as shown in cycle 1 in FIG. 2 the preferred processor 20 has a predictable address development. It is possible to develop the second, third and fourth double words without reference to the addresses actually presented by the processor 20 at later times. This allows the data to be obtained more easily at an earlier time period, thus allowing zero wait state burst read operations after the first read. The equation implemented in the CA23 PAL 328 is as follows:

$$\begin{aligned}MA00 = &\ HA<3> \cdot MUXCAS \cdot /INVMA00 \cdot /HAMACLE \\ + &\ /HA<3> \cdot MUXCAS \cdot INVMA00 \\ + &\ HA<12> \cdot /MUXCAS \\ + &\ MA00 \cdot HAMACLE \\ + &\ MA00 \cdot MUXCAS \cdot HA<3> \cdot /INVMA00\end{aligned}$$

Figure 7C:
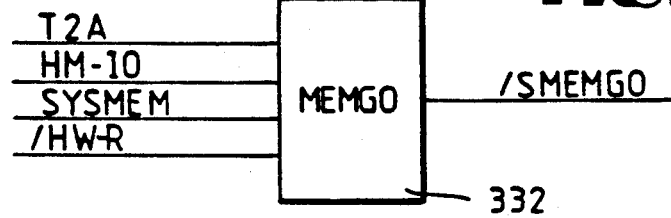
Figure 7D:
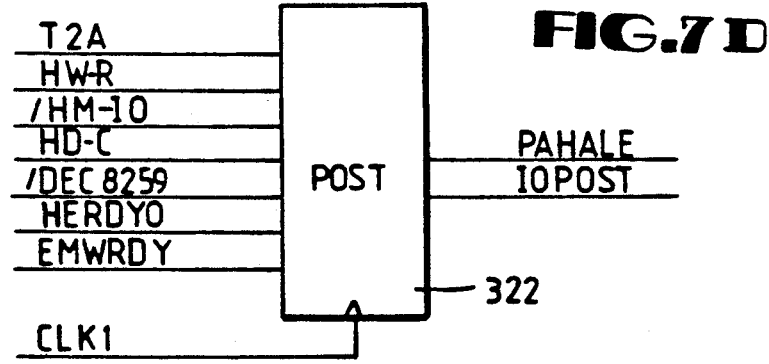
Figure 7E:
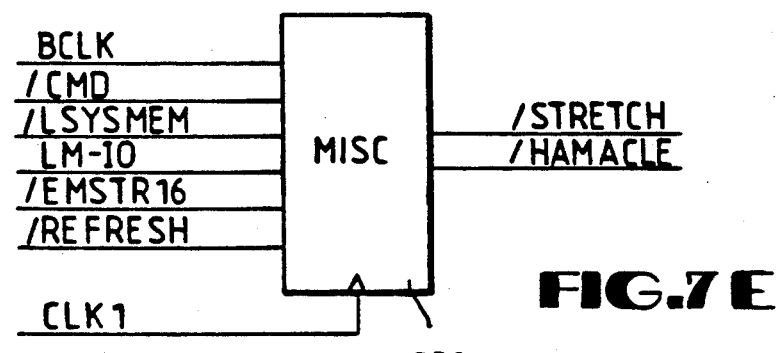

The HAMACLE signal is used to latch the column addresses into latch 52 and is provided as the output of a MISCELLANEOUS PAL 330 (FIG. 7E). The HA<3> and HA<12> signals are the respective bits in the host address bus HA. The first term of the equation is utilized for normal column accesses from the processor 20, from the EISA bus 44 or from the ISP 46. The second term is utilized in the second quadruple word fetch for burst operations from the processor 20. The third term is used during row address presentation to the memory devices, while the fourth term is used to latch the memory address during accesses from the EISA bus 44 or the ISP 46. The final term is provided for deglitching. Thus the least significant address bit can be predicted and developed early for the case of CPU burst read operations as performed in cache line fills.

Another PAL referred to as the CHIT PAL 331 (FIG. 7B) develops the /RDHIT signal used by the synchronous portion of the memory controller 48 to determine if there has been a cache read hit. The equations in the CHIT PAL 331 are as follows:

$$RDHIT = MATCH \cdot /GT256M \cdot /PW\text{-}R \\ \cdot /LNFILL$$

The MATCH signal is provided by the cache controller 28 based on signals provided from the cache tag RAM 24 and is high when the addresses presented by the processor 20 match those validly stored in the cache tag RAM 24. The GT256M signal indicates that the address being requested by the processor 20 is greater than 256 Mbytes, the limit of memory which is addressable for cacheing purposes in the computer system C of the preferred embodiment. The PW-R signal is the WRITE_READ signal as supplied by the processor 20. The LNFILL signal indicates that the processor 20 is requesting an internal cache line fill and is included because after the first portion of a cache line fill there may be an erroneous cache match signal. Thus the read hit signal is high when the address is less then 256 Mbytes, it is a read operation there is a matching address and a line fill operation is not being performed.

The /SMEMGO signal is developed by the MEMGO PAL 332 (FIG. 7C). The SMEMGO signal equation is as follows:

$$SMEMGO = T2A \cdot HM\text{-}IO \cdot SYSMEM$$

The T2A signal is an indication of the processor 20 state and indicates that either a nonburst memory cycle is starting or this is the first cycle in a burst cycle. Thus when a memory cycle is started as indicated by the processor 20, it truly is a memory signal as qualified by the HM/IO signal and it is directed to memory located in the system memory array 50, then the SMEMGO signal is active for one CLK1 signal cycle.

The POST PAL 322 develops the PAHALE signal which is used to latch the host data bus HD data into the latches 56 and 58 and develops the IOPOST signal as utilized by the POUT PAL 320. The equations for the two signals are as follows:

$$\begin{aligned}IOPOST = &\ T2A \cdot /HM\text{-}IO \cdot HW\text{-}R \cdot HD\text{-}C \cdot /HERDY0 \\ + &\ IOPOSTD\end{aligned}$$

$$\begin{aligned}IOPOSTD := &\ T2A \cdot /HM\text{-}IO \cdot HW\text{-}R \cdot HD\text{-}C \cdot \\ &\ /DEC9259 \cdot /HERDY0 \\ + &\ IOPOSTD \cdot /HERDY0\end{aligned}$$

$$\begin{aligned}PAHALE := &\ T2A \cdot HW\text{-}R \cdot + /HM\text{-}IO \cdot HD\text{-}C \cdot /DEC8259 \\ &\ \cdot /(HERDY0 + EMWRDY) \\ + &\ T2A \cdot HW\text{-}R \cdot HM\text{-}IO \cdot /(HERDY0 + EMWRDY) \\ + &\ POST\end{aligned}$$

$$\begin{aligned}POST := &\ T2A \cdot HW\text{-}R \cdot + /HM\text{-}IO \cdot HD\text{-}C \cdot /DEC8259 \\ &\ \cdot /(HERDY0 + EMWRDY) \\ + &\ T2A \cdot HW\text{-}R \cdot HM\text{-}IO \cdot /(HERDY0 + EMWRDY) \\ + &\ POST \cdot /(HERDY0 + EMWRDY)\end{aligned}$$

The HM-IO signal is the M-IO signal present on the host bus and indicates whether a memory or I/O operation is occurring. The HD-C signal is the data-code signal present on the host bus and indicates whether a data or code operation is being performed. The DEC8259 signal is a signal which means that the certain addresses to the interrupt controller located in the ISP 46 have been addressed. This term is presented because these particular addresses are not posted. The HERDY0 signal is a signal provided by the bus controller 34 and is the early ready output from the bus controller 34 to indicate that the devices are ready. The EMWRDY signal is a similar early write ready signal developed by the memory controller 48. These two signals are developed to allow other system components time to prepare for the end of the cycle. It is noted that the IOPOSTD, PAHALE and POST signals are developed out of flip-flops in the POST PAL 322. The clocking signal to these flip-flops is provided by the CLK1 signal.

A MISCELLANEOUS PAL 330 is used to produce the /STRETCH signal and the /HAMACLE signal. The /STRETCH signal is used to develop the CLK1 signal cycle extension during asynchronous operations and is provided to the bus controller 34. The /HAMACLE signal is used to latch the column addresses into the latch 52 during asynchronous operations. During synchronous operations both the /STRETCH and /HAMACLE signals remain at a high level. The equations for the logic located in the MISCELLANEOUS PAL 330 are as follows:

$$STRETCH := SBCLK \cdot /SBCLKD1 \cdot CMD \cdot LSYSMEM \\ \cdot LM\text{-}IO \cdot /EMSTR16 \cdot /REFRESH$$

$$SBCLK := BCLK$$

$$SBCLKD1 := SBCLK$$

$$HAMACLE := /SBCLK \cdot BCLK \cdot CMD \cdot PHLDA \cdot /REFRESH$$

```
  · /EMSTR16 · LSYSMEM · LM-IO
  + HAMACLE · STRETCH
  + HAMACLE · SBCLK · /SBCLKD1
```

The MISCELLANEOUS PAL 330 is a registered design which includes flip-flops, with the CLK1 signal providing the clocking input to these flip-flops. The LSYSMEM signal is a latched version of the SYSMEM signal, while the LM-IO signal is a latched version of the M-IO signal present on the host bus. The SBCLK and SBCLKD signals are shown in FIG. 3. There are portions of each signal where the state is not guaranteed to be valid as indicated by having high and low levels. This condition develops because the fall time of the BCLK signal as compared to the rising edge of the CLK1 signal is such that it cannot be guaranteed that the BCLK signal will be at a given state. Therefore this condition can be considered a don't know and thus is shown with both the high and low signal levels indicated. The PHLDA signal is the XHLDA signal delayed two CLK1 signal cycles.

The foregoing disclosure and description of the invention are illustrative and explanatory thereof, and various changes in the size, shape, materials, components, circuitry, wiring connections and contacts, as well as in the details of the illustrated circuitry, construction and method of operation may be made without departing from the spirit of the invention.

I claim:

1. A computer system comprising:
   a microprocessor providing address, data and control signals according to a first convention, control signals according to said first convention including a signal indicating availability of address values, and a signal indicating completion of a cycle;
   bus control means providing address, data and control signals according to a second convention, control signals according to said second convention including a signal indicating an address portion of a cycle and a signal indicating a data portion of a cycle, wherein said first and second convention control signals are substantially dissimilar;
   a bus for conveying address, data and control signals;
   means for coupling said microprocessor signals to said bus at certain periods and for coupling said bus control means signals to said bus at other periods;
   memory means having address and control inputs and data lines;
   means for coupling said memory means address inputs and data lines to said bus;
   memory controller means coupled to said bus, said memory means control inputs, and said memory means coupling means for controlling said memory means to store and provide data at proper times of both said first and said second conventions, wherein said memory controller means includes a synchronous portion for use when said microprocessor is coupled to said bus and said control signals according to said first convention are utilized and an asynchronous portion for use when said bus control means is coupled to said bus and said control signals according to said second convention are utilized.

2. The computer system of claim 1, wherein said microprocessor and said memory controller means each have a clock signal input, the computer system further comprising:
   a clock signal coupled to said microprocessor and said memory controller means.

3. The computer system of claim 2, wherein said memory controller means synchronous portion includes a state machine and said state machine is advanced by said clock signal.

4. The computer system of claim 3, wherein said memory means coupling means includes a buffer having an output enable input and a plurality of latches having output enable inputs and wherein said memory controller means provides signals to said output enable inputs.

5. The computer system of claim 4, wherein said memory controller means synchronous portion provides a plurality of said output enable signal based on said state machine state.

* * * * *